United States Patent Office 3,445,547
Patented May 20, 1969

3,445,547
PREPARATION OF ESTERS OF
PHOSPHORIC ACID
Charles F. Baranauckas, Memphis, Tenn., and James J. Hodan, Tonawanda, N.Y., assignors to Hooker Chemical Corporation, Niagara Falls, N.Y., a corporation of New York
No Drawing. Filed Dec. 1, 1964, Ser. No. 415,166
Int. Cl. C07f 9/08; C08g 33/16
U.S. Cl. 260—971                                     10 Claims

ABSTRACT OF THE DISCLOSURE

A process for the preparation of primary and secondary polyhydroxy phosphates by admixing oxygen in at least the stoichiometric amount with white phosphorus and a polyhydroxy reactant such as a diol in the presence of a metal or metal oxide catalyst such as aluminum, copper, scandium, titanium, vanadium, chromium, manganese, iron, cobalt, nickel, yttrium, zirconium, niobium, molybdenum, technetium, ruthenium, rhodium, palladium, rhenium, tungsten, osmium, iridium and platinum. The polyhydroxy phosphates are useful in the preparation of polyurethane foams.

This invention relates to a method for the preparation of primary and secondary hydroxy esters of phosphoric acid.

Heretofore, these compounds have been prepared by reacting a hydroxy compound, such as a polyol, with phosphorus pentoxide or by the oxidation of phosphites.

This invention has as an object a direct method for preparing primary and secondary hydroxy esters of phosphoric acid, using phosphorus as a reactant. Other objects of the invention will be apparent from the following detailed description.

It has now been discovered that the reaction of phosphorus, an oxygen-containing gas and a polyhydroxy compound, in the presence of a suitable catalyst, produces primary and secondary polyhydroxy phosphates having the general formulas:

(1) 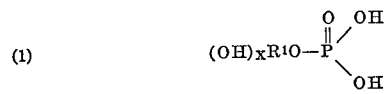

and (2) 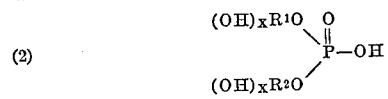

respectively, wherein $R^1$ and $R^2$ are independently selected from the group consisting of hydroxy aliphatic, substituted hydroxy aliphatic, hydroxy alicyclic and substituted hydroxy alicyclic radicals, preferably $R^1$ and $R^2$ are the same, and X is from 2 to 4.

In accordance with the present invention, the reaction is carried out by contacting an oxygen-containing gas with a reaction mixture comprising yellow or white phosphorus and a polyhydroxy compound reactant, in the presence of a catalytic amount of catalyst selected from the group consisting of a metal, a metal oxide, and mixtures thereof.

The polyhydroxy compound reactants, such as a polyol, may be represented by the general formula:

$$R^3(OH)_x$$

wherein $R^3$ is selected from the group consisting of aliphatic, substituted aliphatic, alicyclic and substituted alicyclic radicals, and X is from 2 to 4. In general, the alkyl and substituted alkyl radicals and the corresponding polyhydroxy compound reactants contain from 2 to about 12 carbon atoms, with the preferred alkyl and substituted alkyl radicals and corresponding polyhydroxy compound reactants having from 2 to 8 carbon atoms and the most preferred of these have from 2 to 6 carbon atoms.

In general, the alicyclic and substituted alicyclic radicals and corresponding polyhydroxy compound reactants have from 3 to about 12 carbon atoms, with the preferred alicyclic and substituted alicyclic radicals and corresponding polyhydroxy compound reactants having from 3 to 8 carbon atoms and the most preferred of these have from 3 to 6 carbon atoms.

Illustrative of the polyhydroxy compound reactants which may be effectively employed are ethylene glycol, diethylene glycol, triethylene glycol, tetraethylene glycol, propylene glycol, dipropylene glycol, tripropylene glycol, 1,3-propanediol, 1,2-butanediol, 1,5-pentanediol, 2,5-dimethyl 2,5 - hexanediol, glycerine, 1,2,6 - hexanetriol, erythritol, pentaerythritol, 1,2 - cyclopentanediol, 1,2-cyclohexanediol, 1,2-cyclopropanediol, 1,2-cyclobutanediol, 1,10-decanediol, 1,11-undecanediol, 1,12-dodecanediol, cycloheptanediol, 2,5-diethyl 2,5-hexanediol, 4,6-dipropyl-1,2-cyclohexanediol, 3 chloro - 1,2 - propanediol, 2,5-dinitro - 2,5 - bishydroxymethyl-hexanediol-(1,6), 2-nitro-4-methyl-2-methylol-pentanediol - (1,3), 2,5-bishydroxymethyl-hexanediol-(1,6), 2-nitro - 5 - methyl-2-hydroxymethyl-hexanediol-(1,3), and the like.

The catalyst employed in the practice of this invention is selected from the group consisting of metal, metal oxides, and mixtures thereof. It is more preferred to select the catalyst from the group consisting of aluminum, copper, scandium, titanium, vanadium, chromium, manganese, iron, cobalt, nickel, yttrium, zirconium, niobium, molybdenum, technetium, ruthenium, rhodium, palladium, rhenium, tungsten, osmium, iridium, platinum, their oxides, and mixtures thereof. The most preferred group consists of cuprous oxide, cupric oxide, copper, vanadium pentoxide, cobalt trioxide, and titanium dioxide.

Sufficient metal catalyst is introduced to the reaction to provide about 0.10 percent to 20 percent of catalyst by weight, based on the phosphorus employed. It is preferred to employ 0.10 percent to 10 percent of catalyst and most preferred to employ 0.25 percent to 5 percent of catalyst, on the basis mentioned.

The reaction mixture of phosphorus, polyhydroxy compound reactant and a sufficient amount of catalyst may be prepared in any suitable means. The oxygen-containing gas selected from the group consisting of oxygen, air, oxygen in a carrier gas, e.g., nitrogen, and mixtures thereof, may be reacted by bubbling it through the mixture by means of a sparging system or any other suitable liquid-gas contact technique. A stoichiometric or excess amount of oxygen may be utilized. The excess of oxygen-containing gas may be as much as 200 or more times the stoichiometric amount required to carry out the reaction. Usually, however, one utilizes an excess of oxygen between about 1 and 200 times the stoichiometric amount, with about 1 to 30 times being preferred and 1 to 15 times being most preferred. When oxygen is in a carrier gas, it is usual to employ a mixture which contains from about 1 percent to 99 percent of oxygen, preferred to employ a mixture which contains from 10 percent to 60 percent of oxygen, and most preferred to use a mixture containing from 10 percent to 40 percent oxygen. The rate of addition of the oxygen-containing gas will vary with the oxygen content of the gas. For example, when air is used, it is bubbled through the reaction mixture at a rate of between about one hundred and eighteen hundred milliliters of air per minute per gram mole of phosphorus employed. When oxygen is employed as the oxygen-containing gas the rate of addition can be reduced substantially. Any rate of addition of oxygen-containing gas that is consistent with economic operation may be employed.

The molar ratio of polyhydroxy compound reactant to phosphorus may range from about 1:1 to 15:1, with a preferred range of ratios being from 1:1 to 10:1 and a most preferred range of ratios being from 1:1 to 3:1.

The reaction may be carried out at temperatures ranging from about 50 to 300 degrees centigrade, it being more preferred to maintain a temperature from about 75 to 175 degrees centigrade, with the most preferred temperature range being between 85 and 135 degrees centigrade. It is to be understood that atmospheric, subatmospheric and superatmospheric conditions may be utilized in the practice of this invention.

Completion of the reaction can be determined by suitable means, for example, by measuring the refractive index of a portion of the reaction mixtures. It is within the scope of the invention to carry out this process in a continuous manner. If desired, convenient amounts of solvent, for the reactants of the invention, may be advantageously employed. Examples of such solvents are toluene and xylene. Such solvents may be employed at temperatures within the ranges given above for the reaction.

The hydroxy acid phosphates of this invention are useful in the preparation of non-burning, fine-celled synthetic organic plastic foams, e.g., polyurethane foams, which find use in filtration applications.

The following examples illustrate the process of the invention, however, they are not to be construed as limiting the invention except as defined in the appended claims. All temperatures are in degrees centigrade and all parts are by weight, unless otherwise mentioned.

EXAMPLE 1

The apparatus employed in this example was a three-neck flask provided with a condenser, a thermometer, a heating mantle and a stirrer. Air was pumped through a line equipped with a rotameter which communicated with a gas disperser positioned in the bottom of the flask. One part of phosphorus (1.0 molar proportion), 20 parts of ethylene glycol (10 molar proportions) and a catalytic amount of .032 part cupric oxide were added to the flask and air was continuously fed through the gas disperser, while agitating the mixture, at a rate of .064 part of air per minute. The reactants were heated to a temperature in the range of 95 to 99 degrees centigrade and were maintained at that temperature for four hours. The mixture was stripped to 105 degrees centigrade at one millimeter of absolute pressure. The total residue weighed 34.0 grams. A portion of the filtrate was then analyzed and was found to contain 25.2 percent monohydroxyethyl acid phosphate and 53.2 percent di(hydroxyethyl) acid phosphate.

EXAMPLE 2

Employing the apparatus of Example 1, 402 parts of trimethylolpropane (3.0 molar proportions), 62 parts of phosphorus (2.0 molar proportions) and one part cupric oxide were added to the flask. To this were added 155 parts of toluene and the mixture was stirred. Thereafter, air was continuously bubbled through the reaction mixture at a rate of 1.2 parts of air per minute. The reactants were heated to a temperature in the range of 100 to 125 degrees centigrade and were maintained there for a period of 63 hours. The mixture was stripped to 120 degrees centigrade at ten millimeters of absolute pressure. The total residue weighed 445.6 grams. A portion of the residue was then analyzed and found to contain 45 percent mono[(bishydroxymethyl)butyl] acid phosphate and 38 percent di[(bishydroxymethyl)butyl] acid phosphate.

EXAMPLE 3

Employing the apparatus of Example 1, 62 parts of phosphorus (2.0 molar proportions), 520 parts of neopentyl glycol (5.0 molar proportions) and one part of cupric oxide were added to the flask: To this was added 359 parts of toluene and the mixture was stirred. Thereafter, air was continuously bubbled through the reaction mixture at a rate of 0.6 part of air per minute. The reactants were heated to a temperature in the range of 95 to 120 degrees centigrade and were maintained there for a period of 63 hours. The mixture was stripped to 120 degrees centigrade and a half millimeter of absolute pressure and the residue was filtered to separate the catalyst. A portion of the residue was analyzed and found to contain 46 percent of di(hydroxyneopentyl) acid phosphate and 25 percent mono(hydroxyneopentyl) acid phosphate.

EXAMPLE 4

Employing the apparatus of Example 1, 153 parts of neopentyl glycol (3 molar proportions), 93 parts of ethylene glycol (3 molar proportions), 31 parts of phosphorus (2 molar proportions) and one part of cuprous oxide were introduced to the flask. The reactants were heated to 95 degrees centigrade and air was continuously bubbled through the reaction mixture at a rate of 2 parts of air per minute for a period of 16 hours while maintaining the temperature in the range of 95 to 105 degrees centigrade. The mixture was stripped to 120 degrees centigrade at a half millimeter of absolute pressure. The residue product analyzed 49.3 percent monoacid phosphate, 43.7 percent diacid phosphate and 5.1 percent phosphoric acid.

If desired, the mixture of primary and secondary hydroxy phosphates of the invention may be separated by known techniques such as by the formation of salts having different solubilities, with subsequent separation by fractional crystallization. Analysis of the unseparated residue was carried out with a Sargent Auto Titrater. The products peaked in different areas against a caustic standard to establish the percentages of primary and secondary phosphate present in the product.

In lieu of the copper oxides utilized in the examples, it is also within the scope of this invention, that when elements of the first, second and third transition series are employed, they give similar results. Elements in the first transition series are the more preferred catalysts to be employed in this invention. The most preferred are copper, vanadium pentoxide, cobalt trioxide, titanium dioxide, cuprous oxide, and cupric oxide.

When a gas such as oxygen, oxygen in a carrier gas, or mixtures thereof, is used in place of air similar results are obtained. While the invention has been set forth in relation to the specific examples above, it should be realized that the invention in its broadest aspects is not so limited. Other modifications thereof will become apparent to one skilled in the art upon a reading of this disclosure. Such modifications are considered to be within the scope of this invention.

What is claimed is:
1. A process of preparing a hydroxy ester of phosphoric acid selected from the group consisting of primary and secondary hydroxy esters, comprising contacting an oxygen-containing gas with a reaction mixture comprising white phosphorus and a polyhydroxy compound reactant of the formula

$$R^3(OH)_x$$

wherein $R^3$ is selected from the group consisting of alkyl radicals of 2 to about 12 carbon atoms, cycloalkyl radicals of 3 to about 12 carbon atoms, and substituted alkyl radicals of 2 to about 12 carbon atoms, the substituents being selected from the group consisting of nitro and chloro, and X is from 2 to 4, in the presence of a catalytic amount of a catalyst selected from the group consisting of aluminum, copper, scandium, titanium, vanadium, chromium, manganese, iron, cobalt, nickel, yttrium, zirconium, niobium, molybdenum, technetium, ruthenium, rhodium, palladium, rhenium, tungsten, osmium, iridium and platinum, and oxides of said metals, at a temperature within the range of 50 to 300 degrees centigrade.

2. A process of preparing hydroxy esters of phosphoric acid selected from the group consisting of primary and secondary hydroxy esters comprising passing an oxygen-containing gas through a reaction mixture comprising phosphorus and a polyhydroxy compound having the formula $$R^3(OH)_x$$

wherein $R^3$ is selected from the group consisting of alkyl and substituted alkyl radicals having 2 to about 12 carbon atoms, and cycloalkyl radicals having 3 to about 12 carbon atoms, wherein the substituents are selected from the group consisting of nitro and chloro, and X is from 2 to 4, in the presence of a catalytic amount of a catalyst selected from the group consisting of aluminum, copper, scandium, titanium, vanadium, chromium, manganese, iron, cobalt, nickel, yttrium, zirconium, niobium, molybdenum, technetium, ruthenium, rhodium, palladium, rhenium, tungsten, osmium, iridium and platinum, and oxides of said metals, at a temperature in the range of 75 to 175 degrees centigrade, the molar ratio of the polyhydroxy compound to the phosphorus compound ranging from about 1:1 to about 15:1, and the oxygen of said oxygen-containing gas being present in said reaction mixture in at least a stoichiometric proportion.

3. A process in accordance with claim 2 wherein the metal catalyst is selected from the group consisting of cuprous oxide, cupric oxide, copper, vanadium pentoxide, cobalt trioxide and titanium dioxide, and is present in the range of from about 0.10 percent to 20.0 percent by weight, based on phosphorus employed.

4. A process in accordance with claim 3 wherein the oxygen-containing gas is selected from the group consisting of oxygen, air, and oxygen in a carrier gas.

5. A process according to claim 2 in which said temperature ranges from about 85 degrees to about 135 degrees centigrade, and said polyhydroxy compound has a molar ratio to said phosphorus of about 1:1 to about 3:1, said metal and metal oxide catalyst are of a member selected from the group consisting of aluminum, copper, scandium, titanium, vanadium, chromium, manganese, iron, cobalt, nickel, yttrium, zirconium, niobium, molybdenum, technetium, ruthenium, rhodium, palladium, rhenium, tungsten, osmium, iridium and platinum.

6. A process of preparing a primary hydroxy ester of phosphoric acid comprising passing an oxygen-containing gas through a reaction mixture comprising phosphorus and a polyhydroxy compound having the formula $$R^3(OH)_x$$

wherein $R^3$ is selected from the group consisting of alkyl radicals of 2 to about 12 carbon atoms, cycloalkyl radicals of 3 to about 12 carbon atoms and substituted alkyl radicals of 2 to about 12 carbon atoms, the substituents being selected from the group consisting of nitro and chloro, and X is from 2 to 4, in the presence of a catalytic amount of a ctalyst selected from the group consisting of aluminum, copper, scandium, titanium, vanadium, chromium, manganese, iron, cobalt, nickel, yttrium, zirconium, niobium, molybdenum, technetium, ruthenium, rhodium, palladium, rhenium, tungsten, osmium, iridium and platinum, and oxides of said metals, at a temperature within the range of 50 to 300 degrees centigrade, and thereafter separating the primary hydroxy ester from the reaction mixture.

7. A process of preparing a secondary hydroxy ester of phosphoric acid comprising passing an oxygen-containing gas through a reaction mixture comprising phosphorus and a polyhydroxy compound having the formula $$R^3(OH)_x$$

wherein $R^3$ is selected from the group consisting of alkyl radicals of 2 to about 12 carbon atoms, cycloalkyl radicals of 3 to about 12 carbon atoms and substituted alkyl radicals of 2 to about 12 carbon atoms, the substituents being selected from the group consisting of nitro and chloro, and X is from 2 to 4, in the presence of a catalytic amount of a catalyst selected from the group consisting of aluminum, copper, scandium, titanium, vanadium, chromium, manganese, iron, cobalt, nickel, yttrium, zirconium, niobium, molybdenum, technetium, ruthenium, rhodium, palladium, rhenium, tungsten, osmium, iridium and platinum, and oxides of said metals, and thereafter separating the secondary hydroxy ester from the reaction mixture.

8. A process of preparing mixed hydroxy esters of phosphoric acid selected from the group consisting of primary and secondary mixed hydroxy esters comprising passing an oxygen-containing gas through a reaction mixture comprising phosphorus and at least two, independently selected polyhydroxy compounds having the formula $$R^3(OH)_x$$

wherein $R^3$ is selected from the group consisting of alkyl and substituted alkyl radicals having 2 to about 12 carbon atoms, and cycloalkyl radicals having 3 to about 12 carbon atoms, and X is from 2 to 4, the substituents being selected from the group consisting of nitro and chloro, in the presence of a catalytic amount of a catalyst selected from the group consisting of aluminum, copper, scandium, titanium, vanadium, chromium, manganese, iron, cobalt, nickel, yttrium, zirconium, niobium, molybdenum, technetium, ruthenium, rhodium, palladium, rhenium, tungsten, osmium, iridium and platinum, and oxides of said metals at a temperature within the range of 50 to 300 degrees centigrade.

9. A process of preparing hydroxy esters of phosphoric acid selected from the group consisting of primary and secondary hydroxyalkyl phosphates, comprising passing air through a reaction mixture comprising phosphorus and a polyhydroxy compound having the formula $$R^3(OH)_2$$

wherein $R^3$ is selected from the group consisting of alkyl and substituted alkyl radicals having 2 to 6 carbon atoms, the substituents being selected from the group consisting of nitro and chloro, in the presence of 0.25 to 5 percent of cupric oxide, at a temperature in the range of 85 to 135 degrees centigrade.

10. A process of preparing hydroxy esters of phosphoric acid selected from the group consisting of primary and secondary hydroxyalkyl phosphates, comprising passing air through a reaction mixture comprising phosphorus and a polyhydroxy compound having the formula $$R^3(OH)_2$$

wherein $R^3$ is selected from the group consisting of alkyl and substituted alkyl radicals having 2 to 6 carbon atoms, the substituents being selected from the group consisting of nitro and chloro, in the presence of 0.25 to 5 percent of cupric oxide, at a temperature in the range of 85 to 135 degrees centigrade, and thereafter separating the primary from the secondary hydroxy alkyl phosphates.

References Cited

UNITED STATES PATENTS 3,333,030  7/1967  Baranauckas et al.  260—971 XR

CHARLES B. PARKER, *Primary Examiner.*

A. H. SUTTO, *Assistant Examiner.*

U.S. Cl. X.R.

260—2.5, 953